United States Patent [19]

Hinds

[11] 4,215,283
[45] Jul. 29, 1980

[54] LINEAR STEPPING MOTOR

[76] Inventor: Walter E. Hinds, 1358 Schulyer Rd., Beverly Hills, Calif. 90210

[21] Appl. No.: 902,477

[22] Filed: May 3, 1978

[51] Int. Cl.² ............................................. H02K 37/00
[52] U.S. Cl. ...................................... 310/14; 318/135
[58] Field of Search .................................... 310/12–14, 310/30; 335/267; 176/36; 318/135, 687

[56] References Cited

U.S. PATENT DOCUMENTS

| | | | |
|---|---|---|---|
| 2,303,263 | 11/1942 | Fisher | 310/14 |
| 2,365,632 | 12/1944 | Fisher | 310/14 |
| 2,483,895 | 10/1949 | Fisher | 310/14 X |
| 3,130,331 | 4/1964 | Jallen et al. | 310/14 |
| 3,155,851 | 11/1964 | Francis | 310/13 |
| 3,162,796 | 12/1964 | Schreiber et al. | 318/687 X |
| 3,185,909 | 5/1965 | Jahn | 310/12 X |
| 3,219,853 | 11/1965 | Schreiber | 335/267 X |
| 3,376,441 | 4/1968 | Martin et al. | 310/13 |
| 3,433,983 | 3/1969 | Keistman et al. | 310/12 X |
| 3,548,273 | 12/1970 | Parodi et al. | 310/14 X |
| 3,566,224 | 2/1971 | Vallauri et al. | 310/14 X |

*Primary Examiner*—Donovan F. Duggan
*Attorney, Agent, or Firm*—Caesar, Rivise, Bernstein & Cohen, Ltd.

[57] ABSTRACT

A linear stepping motor comprising a stator having a central passageway extending therethrough and a secondary in the form of an elongated cylindrical member disposed within the passageway. The stator is formed of a plurality of coil groups, each group including at least one hollow coil disposed between a pair of magnetic stator plates. The coil groups are disposed co-axially, with immediately adjacent groups separated by respective hollow non-magnetic spacer. The secondary includes a plurality of annular rings of magnetic material disposed at equally spaced locations along the secondary. The coil groups are sequentially pulsed by electrical energy to effect the stepwise movement of the secondary along the passageway.

In one embodiment the secondary is a magnetic material rod having a plurality of peripheral grooves cut at equally spaced locations therealong, with the portions of the rod between the grooves forming the annular rings.

In another embodiment the secondary is in the form of a hollow tube having a fixed rod-like insert therein. The tube is formed of portions of magnetic and non-magnetic material, with the annular rings being formed of magnetic material. The insert is formed of magnetic and non-magnetic material sections, with the magnetic sections being disposed opposite to the coil groups of the stator.

Means are provided for locking the secondary at any predetermined output position.

13 Claims, 9 Drawing Figures

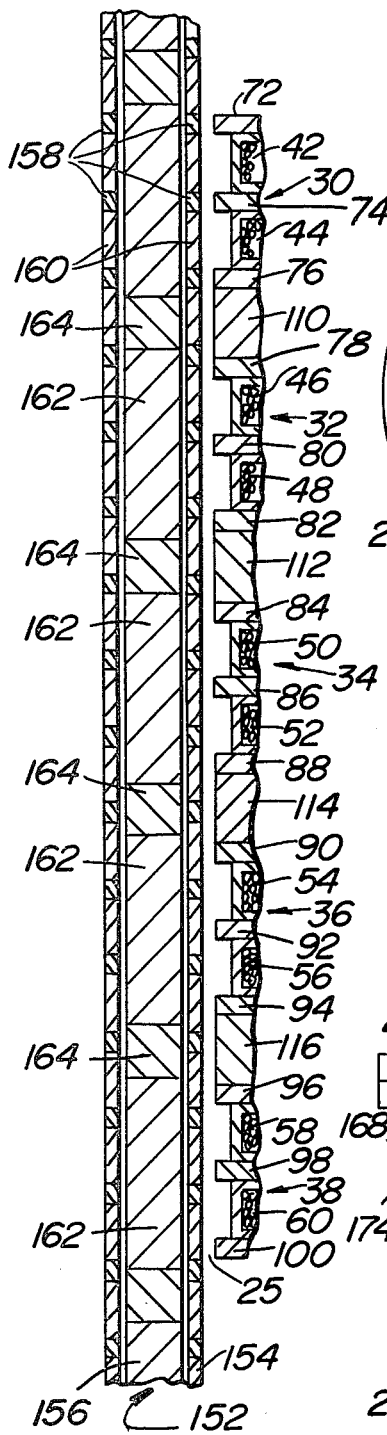

LINEAR STEPPING MOTOR

This invention relates generally to electric motors and more specifically to linear stepping motors.

In U.S. Pat. Nos. 3,148,292 and 3,155,852, assigned to the same assignee as the instant invention and whose disclosure is incorporated by reference herein, there are disclosed and claimed linear induction motors. The motors are extremely simple in construction and consist of two basic parts, a cylindrical or round rod secondary and a stator through which the rod extends. The stator is essentially a series of Gramme-wound coils separated by flat electromagnetic plates. Linear motion of the rod through the stator or of the stator along the rod, is induced by sweeping a magnetic field along the length of the stator via the energization of its coils. The motors can operate on either three phase alternating current or with a capacitor on single phase alternating current.

The motors of the aforementioned patents exhibit several distinct advantages over the prior art linear motors such as simplified construction, low cost, elimination of cogging, production of long strokes at uniform force, etc.

Like any linear induction motor, the round rod type motors of the above identified patents are incapable, per se, of providing a positioned output, since the rod, once excited, picks up velocity and continues to accelerate until it leaves the stator. In order to control speed, starting, stopping and displacement of the motor's rod, control means are required. Such control means typically comprise simple switches, mechanical as well as solid state, for position control and velocity sensing, eddy current monitors and associates Silicon Controlled Rectifier controllers for speed control.

Even when a round rod linear induction motor is deenergized to stop it, additional means must be provided to hold it in place at the stop position. For example, in U.S. Pat. No. 3,376,441, also assigned to the same assignee as the instant invention, there is disclosed coil means for locking the rod in place with reduced power at the end of its stroke.

Linear stepping motors suitable for providing positioned output which can be held have been disclosed in the art and some are commercially available. Such motors operate by variable reluctance wherein pole pieces mounted on an armature are moved to positions of least reluctance to align with poles of the stator. Such motors, while effective for producing linear stepwise motion of the armature as the coils of the stator are energized sequentially, nevertheless exhibit several drawbacks. The most important of those drawbacks being that such motors are rather complex in construction and hence expensive to build.

Accordingly, a need exists for linear motors which have the low cost and simplified construction advantages inherent in the round rod linear motor of the aforementioned patents, yet which are suitable for stepwise operation. It is therefore a general object of the instant invention to provide an improved linear stepping motor.

It is a further object of the instant invention to provide a round rod, linear stepping motor.

It is still a further object of the instant invention to provide a round rod linear steping motor which is simple in construction.

It is still a further object of the instant invention to provide an efficient linear stepping motor.

It is still a further object of this invention to provide a high force linear stepping motor.

It is still a further object of this invention to provide a linear stepping motor capable of securely holding an output position.

It is yet a further object of the instant invention to provide a linear stepping motor having a low mass, moving member suitable for high acceleration applications.

These and other objects of the instant invention are achieved by providing a linear stepping motor comprising a stator defining a central passageway extending longitudinally therethrough and a secondary in the form of an elongated cylindrical member. The member is disposed longitudinally within the passageway of the stator. The stator comprises a plurality of coil groups, each group including at least one hollow coil winding disposed between a pair of magnetic stator plates and within a magnetic coil housing. Each of the stator plates has an opening therein co-axial with the hollow interior of the coil winding. The coil groups are disposed co-axially, with immediately adjacent groups being separated by a respective hollow non-magnetic spacer aligned co-axially with the coil groups to form the central passageway. The elongated cylindrical secondary includes a plurality of annular rings of magnetic material disposed at predetermined equally spaced locations along the member. The coil groups of the stator are arranged to be pulsed by electrical energy in a predetermined sequence to effect the stepwise motion of the elongated cylindrical member along the passageway.

In accordance with one embodiment of the invention the elongated cylindrical member is a rod formed of a magnetic material with a plurality of peripheral grooves cut therein at equidistantly spaced locations therealong and with the peripheral portions of the rod between the grooves forming the annular rings.

In accordance with another embodiment of the invention means are provided to lock the secondary in any output position. The locking means comprises at least one reciprocating member adapted to move into an associated groove in the secondary when the secondary is in the desired position.

In accordance with yet another embodiment of the invention the secondary is a composite hollow tube, with the tube portions disposed between the annular rings being formed of a non-magnetic material. A cylindrical rod-like insert is disposed within the hollow tube but fixed with respect to the stator. The insert is formed of magnetic and non-magnetic material sections, with the magnetic sections being disposed opposite to the coil groups of the stator.

Other objects and many of the attendant advantages of this invention will be readily appreciated as the same becomes better understood by reference to the following detailed description when considered in connection with the accompanying drawing, wherein:

FIG. 6 is a sectional view of the secondary of an alternative embodiment of the motor shown in FIG. 2;

FIG. 7 is an enlarged sectional view of means for locking the position of the secondary;

FIG. 8 is a reduced elevational view of the locking mechanism shown in FIG. 7; and FIG. 9 is a view similar to that of FIG. 8.

Referring now to the various figures of the drawing wherein like reference characters refer to like parts, there is shown at 20 in FIG. 1 a round rod linear stepping motor in accordance with the instant invention.

Figure 1:
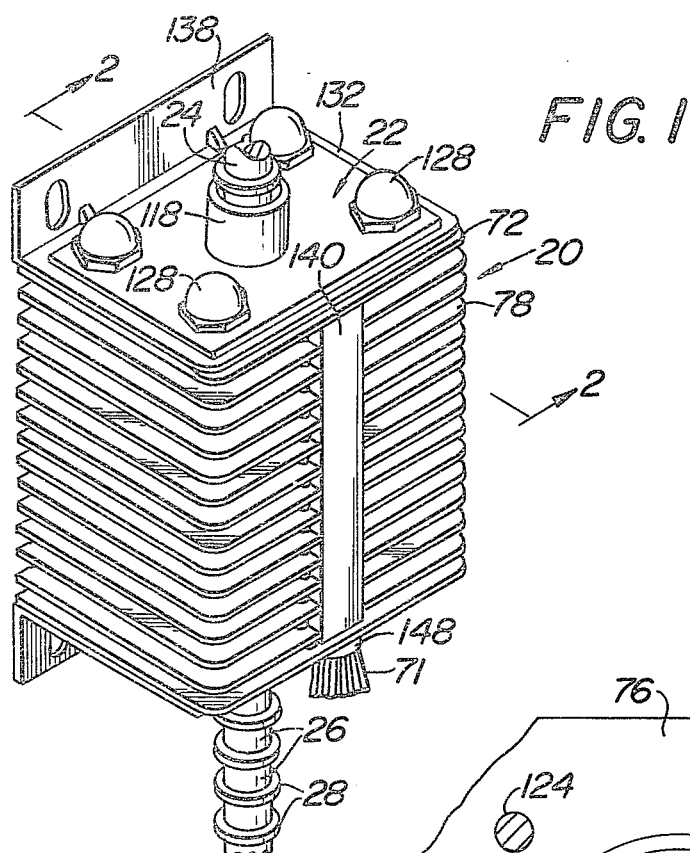
FIG. 1 is a perspective view of one embodiment of a linear stepping motor in accordance with the instant invention.
Figure 3:
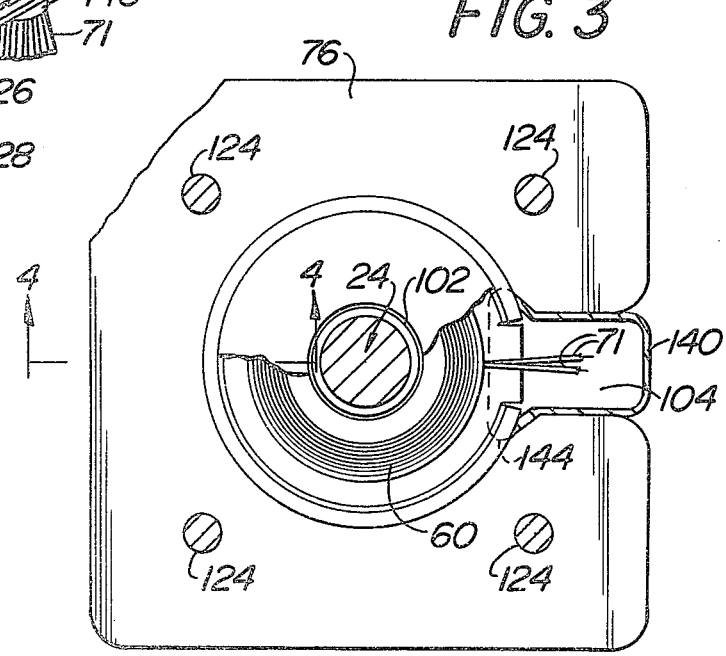
FIG. 3 is a sectional view taken along line 3—3 of FIG. 2.

The motor 20 basically comprises a stator, generally designated 22, and a movable secondary in the form of a plunger or rod 24. The secondary is supported by bearing means (to be described later) within a passageway 25 of the stator 22 for relative longitudinal movement therealong.

Figure 2:
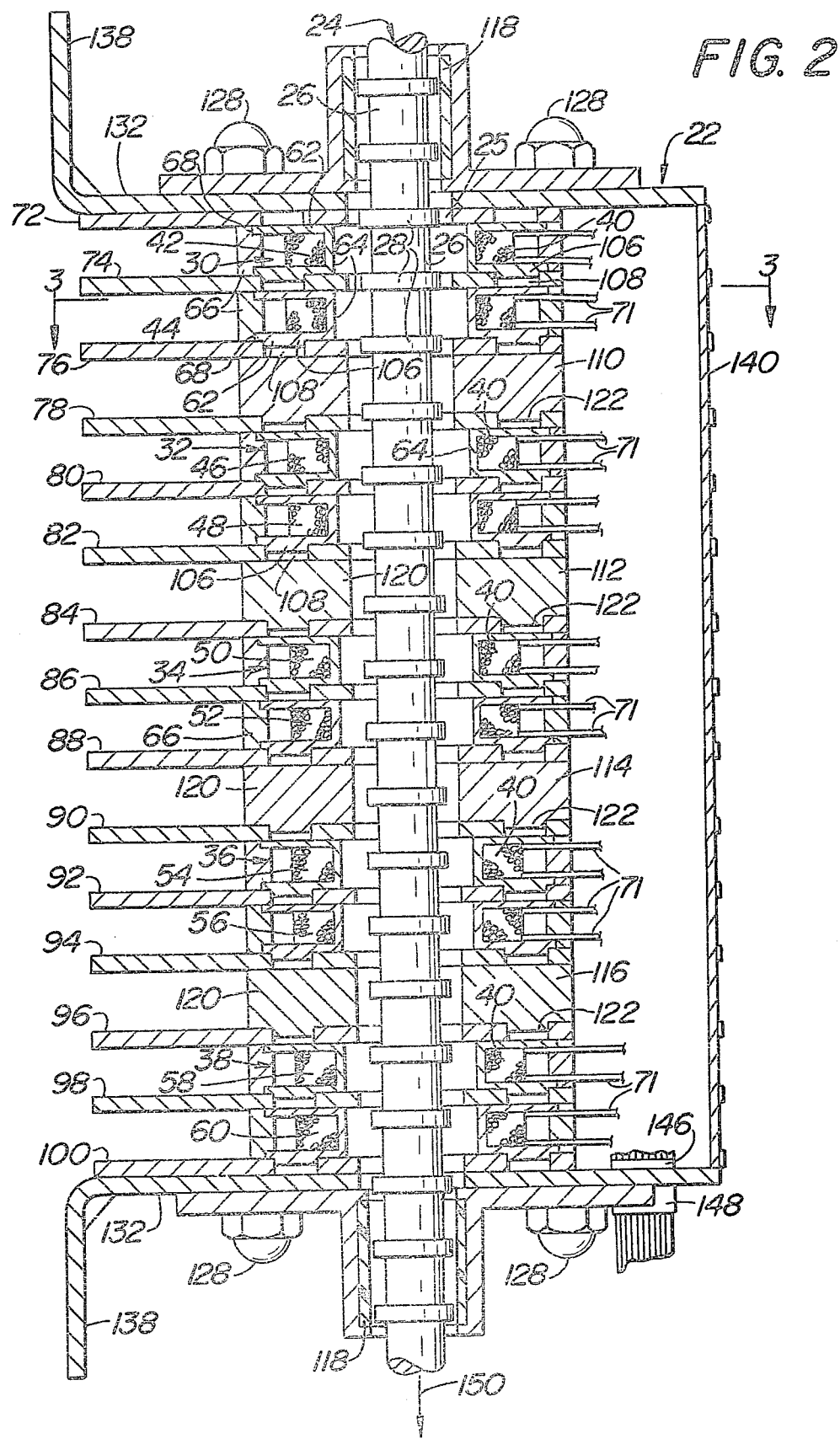
FIG. 2 is an enlarged sectional view taken along line 2—2 of FIG. 1.

As can be seen in FIG. 2, the secondary or rod 24 is an elongated member having a plurality of annular recesses 26 cut in the periphery thereof. The recesses are located at equally spaced locations along the length of the rod 24 with the larger diameter portions of the rod between adjacent grooves 26 being in the form of annular rings which are designated by the reference numeral 28 and which serve as the salient teeth of the secondary. As will be appreciated by those skilled in the art, each tooth 28 and one of its contiguous grooves 26 forms a single pitch of the secondary.

In the preferred embodiment of the motor 20 shown in FIG. 2 the stator 22 comprises five groups of field coils, namely, 30, 32, 34, 36 and 38. Each of the groups forms a respective phase of the motor. As will be described in detail later, the groups 30-38 defining the motors phases are arranged to be pulsed in a predetermined sequence by a source of electrical energy to effect the stepwise movement of the secondary down the central passageway 25 in the stator 22.

As can be seen in FIG. 2, each of the coil groups contains a pair of Gramme-wound coils. To that end, coil group 30 includes coils 42 and 44, coil group 32 includes coils 46 and 48, coil group 34 includes coils 50 and 52, coil group 36 includes coils 54 and 56 and coil group 38 includes coils 58 and 60.

Figure 5:
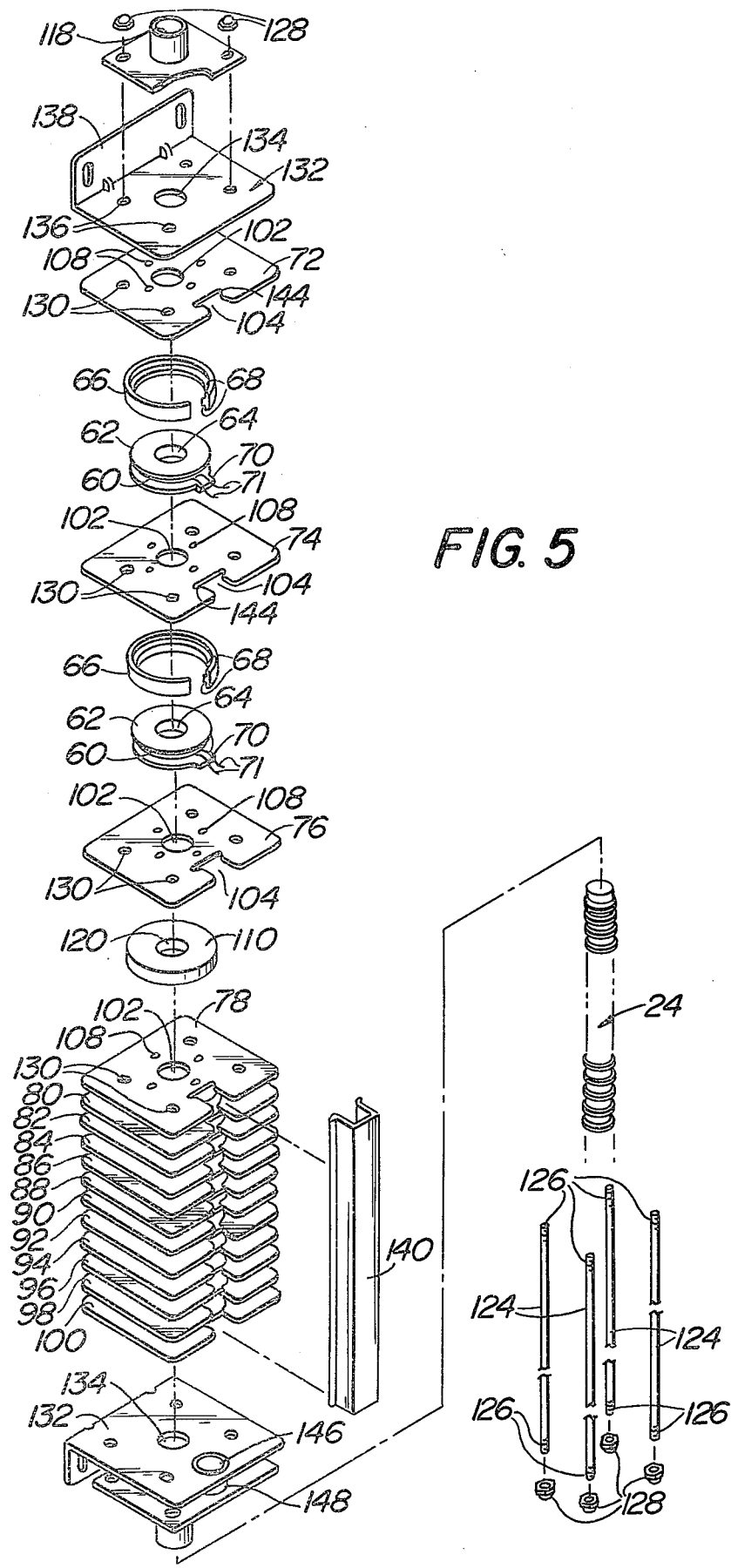
FIG. 5 is an exploded perspective view of the motor shown in FIG. 1.

As can be seen in FIG. 5, each coil is formed of electrically conductive wire 40 wound on a bobbin or spool 62 and having a central aperture or passageway 64, and each bobbin is provided with a generally C-shaped magnetic backing member 66. Each of the backing members includes a pair of edge grooves 68 forming a ledge for receipt of a respective free edge of the spool's flanges. To faciliate assembly of the bobbin 62 and housing 66 one flange of the bobbin is provided with a radially extending tab 70 (FIG. 5) which assists in circumferentially positioning the housing relative to the bobbin such that the opening of the C is radially aligned with the tab 70 to provide an opening through which the coil connecting leads 71 can be brought.

Each coil is disposed between a pair of flat stator plates. To that end, coil 42 is disposed between stator plates 72 and 74, coil 44 is disposed between stator plages 74 and 76, coil 46 is disposed between stator plates 78 and 80, coil 48 is disposed between stator plates 80 and 82, coil 50 is disposed between stator plates 84 and 86, coil 52 is disposed between stator plates 86 and 88, coil 54 is disposed between stator plates 90 and 92, coil 56 is disposed between stator plates 92 and 94, coil 58 is disposed between stator plates 96 and 98 and coil 60 is disposed between stator plates 98 and 100

Each of the stator plates is of identical construction and is preferably formed as a stamping of magnetic material. As can be seen in FIG. 5, the stator plates 72-100 are of generally rectangular shape and each includes a central opening 102, which along with the opening 64 in each of the coils form the central passageway 25 of the stator 22. As can be seen in FIG. 2, the diameter of the opening 102 in each of the stator plates is slightly less than the diameter of the aperture 64 in the coil bobbins. Accordingly, the stator plates extend inward into the central passageway 25 to form teeth or poles of the stator.

Figure 4:
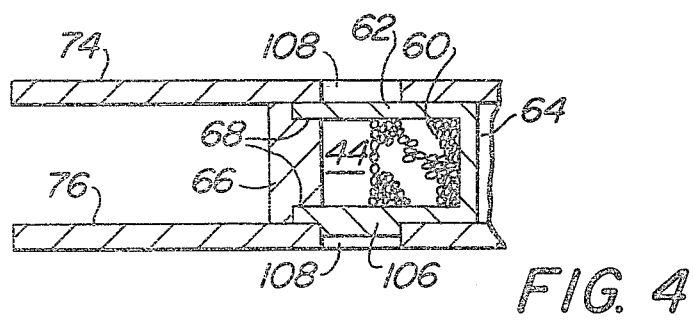
FIG. 4 is an enlarged sectional view taken along line 4—4 of FIG. 3.

As can be seen in FIG. 5, each stator plate also includes an inwardly extending notch 104. The notch is positioned in the one edge of the plate so that it is in alignment with the tab 70 of the coil bobbin 62 when the apertures 64 and 102 are co-axially aligned. To facilitate the alignment of the coil bobbins and the abutting stator plates each bobbin and its associated plates are provided with cooperating positioning elements which, in a preferred embodiment include a plurality of projections 106 provided in the bobbin flange (see FIGS. 2 and 4) which cooperate with suitable recesses or apertures 108 formed in the abutting stator plate so as to positively position the coil bobbin co-axially relative to the aperture in the stator plate.

The coil groups of each phase are separated from one another by non-magnetic spacing members. To that end, an annular spacer 110 is disposed between the stator plates 76 and 78, a spacer 112 is disposed between stator plates 82 and 94, a spacer 114 is disposed between stator plates 88 and 90 and a spacer 116 is disposed between stator plates 94 and 96. All of the spacers 110, 112, 114 and 116 are identical and are formed of a nonmagnetic material, such as aluminum or a plastic, and each includes a central opening 120. The spacers are located within the stator 22 such that their central openings 120 are co-axial with the passageway 25 formed by the stator plates and associated coils. The location of the spacers 110, 112, 114 and 116 is accomplished via the use of similar cooperating positioning elements to the elements 106 and 108. To that end, each of the spacers includes a plurality of projections 122 which are received within the associated recesses or apertures 108 in the adjacent stator plates.

As can be seen in FIGS. 2 and 5, the components making up the stator, that is the coil groups, stator plates and spacers are held together in proper alignment by a plurality of studs 124 which are threaded at each end 126 to receive suitable nuts 128. The studs pass through suitable aligned apertures 130 in each of the stator plates.

In the illustrated embodiment of motor 20 the ends of the stator are each in the form of an end plate 132. The end plates are flanged members having central openings 134 aligned with the openings 102 in the stator plates to form the central poassageway 25 and having openings 136 aligned with the openings 130 in the stator plates for receipt of the studs 124. Each of the end plates includes a flanged slotted portion 138 for supporting the assembled motor 20. A sleeve bearing assembly 118 is mounted on each of the end plates and supports the secondary for reciprocating movement along the stator's passageway.

As noted heretofore, each stator plate includes a notch 104 therein. When the plates are stacked to form the motor 20, as shown in FIG. 2, the notches define a passageway through which the electrical connections to the coils are effected. A cover strip 140 formed of any suitable material is made generally U-shaped to fit within the notch 104 and is provided with inwardly turned legs 142 which engage recesses 144 at the inner edges of the notch 104 in each stator plate. The desired connections are made within the passageway and covered by the cover strip 140 with the connections extending outward through a suitable aperture 146 in which a fiber spacer disc and a coupling, 148 are supported.

The coils making up any group or phase of the motor 20 are electrically connected to each other, via either a series or parallel connection, depending upon the design objectives, e.g., the amount of voltage or current desired, etc. Notwithstanding the type of interconnection utilized all of the coils of any given phase are energized in unison. This action produces magnetic poles at the stator plates of the coils forming the energized phase. For example, when the phase or coil group 30 is energized a pair of primary flux paths are created, one path encircles the coil 42 and includes the magnetic back piece 66 of the coil, the abutting stator plate 72, the abutting stator plate 74, the air in passageway 40 and the secondary or rod 22, with each of the stator plates 72 and 74 forming a respective magnetic pole. The other flux path encircles coil 44 and includes the magnetic back piece 66 of that coil, the abutting stator plate 76, the abutting stator plate 74, the air in passageway 40 and the rod 24, with each of the stator plates 74 and 76 forming a respective magnetic pole.

The energization of any of the phases or coil groups, in the manner described with reference to coil group 30, causes the magnetic secondary or rod 20 to move down the passageway 40 to a position of least reluctance in the flux path created. As will be appreciated by those skilled in the art, the position of least reluctance of rod 22 with respect to the coil group or phase 30 is when the salient teeth 28 of the rod are aligned with the pole-forming stator plates 72, 74 and 76. The movement of rod 22 to the longitudinal position wherein the salient teeth 28 are aligned with the poles of the coils of group 30 necessarily results in the misalignment of the salient teeth of the rod with the stator plates of the other phases. However, subsequent energization of another phase causes the rod 22 to be moved down the stator until the rod's salient teeth align with the stator plates of the energized phase. Subsequent energization of another phase results in the further movement of the rod down the stator.

In accordance with a preferred embodiment of this invention the phases of the motor 20 are energized suquentially from a controller (not shown) which causes the rod to move from phase to phase in a stepwise motion of equal displacement by the rod locking into plate at each phase with equal axial pull-in force.

Operation of the motor 20 shown in FIG. 2 is as follows: coil group or phase 30 is energized first with either current or voltage pulses, as desired, of predetermined duration from the controller (not shown). This action causes the secondary or rod 24 to move to the right (shown by the arrow 150 in FIG. 2) to the position wherein its salient teeth are aligned with the magnetic poles formed by the stator plates 72, 74 and 76. When it is desired to move the rod the next step down the stator the controller deenergizes coil group 30 and energizes the next coil group in the same manner as described heretofore. In the example shown in FIG. 2 the next phase energized is the coil group 32. The energization of coil group 32 causes the rod 24 to move from the position shown in FIG. 2 in the direction of arrow 150 down the stator passageway 25 until the rod's salient teeth align with the magnetic poles formed by the stator's plates 78, 80 and 82. Successive steps of the rod 24 of the motor shown in FIG. 2 are accomplished by energizing phases 34, 36 and 38 in that order. After phase 38 has been energized the cycle of operation, as described heretofore, may be repeated (providing the rod or secondary 24 is sufficiently long). If not the rod may be stepped back by an opposite energization sequence.

As will be appreciated by those skilled in the art, the velocity achieved by the motor in each step is a function of the rate at which the phases are energized sequentially while the force produced is a function of the number of coils energized and the amount of current applied. The total displacement of the motor is a function of the number of times that the phases are energized. The length of each step that the rod makes is a function of the geometry of the motor. An analysis of the geometry of the embodiment of motor 20 is shown in FIG. 2 as follows:

If one pitch of the stator, that is the width of any coil group or phase is defined as b, the pitch of the secondary as $\lambda$, the width of each stator plate and secondary tooth as $t_w$, the width, S, of each spacer is defined by the formula:

$$S = b - 2\lambda - t_w \qquad (1)$$

As will be appreciated by those skilled in the art, the size of each step taken by the secondary of the motor 20 of FIG. 2 is defined by the formula:

$$\text{step size} = -b + 3\lambda \qquad (2)$$

In order for the secondary to be capable of continued stepwise motion after each group of coils has been energized once, the secondary must move to a distance equal to the pitch ($\lambda$) of the secondary to align the salient teeth of the secondary with the poles of the stator. As will be appreciated by those skilled in the art, if the primary includes n group of coils, which are sequentially energized before repeating, then the minimum step size per energization is defined by the formula:

$$\text{minimum step size} = \lambda/n \qquad (3)$$

Equating the minimum step size with the step size as defined by the formula (3) results in the definition of the spacer width as a function of the pitch of the secondary and the number of coil groups, by the formula:

$$b = \lambda(3 - 1/n) \qquad (4)$$

As noted heretofore, the motor 20 shown in FIG. 2 contains five coil groups. In a preferred practical embodiment of that motor the pitch ($\lambda$) of the secondary is 0.5 inch (12.7 mm) and the thickness of each stator plate and tooth of the secondary is 0.125 inch (3.18 mm). Accordingly, using formula (3):

minimum step size = 0.5/5 = 0.1 inch (2.54 mm)

Using formula (4) the pitch (b) of the secondary is calculated as follows:

$b = 0.5 (3 - 1/5)$ $b = 0.5 (2.8) = 1.4$ inch (35.6 mm)

Using formula (1) the width (S) of the spacer is calculated as follows:

$S = 1.4 - 2 (0.5) - (0.125)$ $S = 0.275$ inch (7.0 mm)

It must be pointed out at this juncture that the motor 20 as specified above is merely exemplary of one practical preferred embodiment of the invention. Many other motors of the same configuration, e.g., two coils per group, are possible in accordance with the instant invention as well as motors of different configurations. To that end, the following TABLE 1 shows the dimension specifications for seven motors each having only one coil per group. The motors identified in TABLE I are classified according to the total number of coil groups (n) used in the motor, the pitch (b) of the primary of the motor and the width (S) of the spacers. The pitch of the secondary is 0.5 inch (12.7 mm), and the width of each stator plate and secondary tooth is 0.125 inch (3.18 mm) in all cases. The subscripts used in the table serve to identify corresponding components of the different motors for each of the coil group types (n). All dimensions are in inches, with metric conversions in millimeters being shown in accompanying parentheses:

TABLE I

| $\lambda/n$ | $b_1$ | $b_2$ | $b_3$ | $S_1$ | $S_2$ | $S_3$ |
|---|---|---|---|---|---|---|
| .167 | .667 (16.9) | .833 (21.2) | 1.167 (29.6) | .042 (1.07) | 0.208 (5.28) | .542 (13.8) |
| .125 | .625 | .875 (22.2) | 1.125 (28.6) | 0 | 1.25 (6.35) | .500 (12.7) |
| 1 | .600 | .9 (22.9) | 1.1 (27.9) | — | 0.275 (6.98) | .475 (12.1) |

The following TABLE II is similar to TABLE I, but represents seven motors, each having two coils per group. As can be seen, the motor 20 of FIG. 2 and described heretofore is identified in TABLE II by underlining:

TABLE II

| n | $\lambda/n$ | $b_1$ | $b_2$ | $b_3$ | $S_1$ | $S_2$ | $S_3$ |
|---|---|---|---|---|---|---|---|
| 3 | .167 | 1.167 (29.6) | 1.333 (33.9) | 1.667 (42.3) | .042 (1.07) | .208 (5.28) | .542 (13.8) |
| 4 | .125 | 1.125 | 1.375 (34.9) | 1.625 (41.3) | 0 | .25 (6.35) | .5 (12.7) |
| 5 | .1 | 1.100 | 1.4 (35.6) | 1.6 (40.6) | | .275 (6.98) | .475 (12.1) |

The following TABLE III is similar to TABLES I and II, but represents five different motors in accordance with the instant invention, each having three coils per group:

TABLE III

| n | $\lambda/n$ | $b_1$ | $b_2$ | $b_3$ | $S_1$ | $S_2$ | $S_3$ |
|---|---|---|---|---|---|---|---|
| 3 | .167 | 1.667 (42.3) | 1.833 (46.6) | 2.167 (55.0) | .042 (1.07) | .208 (1.07) | .542 (13.8) |
| 5 | .1 | 1.600 | 1.90 (48.3) | 2.1 (53.3) | | .275 (6.98) | .475 (12.1) |

The following Table IV is similar to TABLES I, II, and III but represents five different motors in accordance with the instant invention and having four coils per group:

TABLE IV

| n | $\lambda/n$ | $b_1$ | $b_2$ | $b_3$ | $S_1$ | $S_2$ | $S_3$ |
|---|---|---|---|---|---|---|---|
| 3 | .167 | 2.167 (55.0) | 2.333 (59.2) | 2.667 (67.7) | .042 (1.07) | .208 (5.28) | .542 (13.8) |
| 5 | .1 | 2.100 | 2.4 (66.0) | 2.6 (66.0) | | .275 (6.98) | .475 (12.1) |

It must be pointed out at this juncture that the motor examples given heretofore in TABLES I–IV are merely exemplary and that various other configurations are contemplated within the scope of this invention.

The controller for the motor 20, is a solid state device operating on 50/60 hertz, single phase power. The controller operates in response to input commands from either a manually operated, self-contained panel or from a remotely controller microprocessor or similar signal source. Input commands consist of: direction of motion; single step or "inching", distance to be moved or number of steps to be taken; and stop and hold position. When moving a distance of more than one step the pulses fed to the stator coils are displaced in time to allow the secondary and its connected load to accelerate without falling out of synchronism. Similarly, as the rod and load reach the end of travel the stepping times decrease. This relationship is optimized so that the rod accelerates with the first half of travel and decelerates with the second half. The acceleration and deceleration is established by an internal adjustment on the controller.

The controller energizes the coils sequentially by providing energy pulses, either voltage or current (preferred) from phase to phase during the stepping sequence, with a slight overlap between successive pulses so as to prevent dropout. The pulses are preferably of a square wave shape. The controller includes means for establishing the number of pulses to be applied, thus establishing the displacement of the motor's secondary. Such means includes a counter calibrated in terms of tens, ones and tenths of an inch so as to provide precise positioning adjustment. The controller also includes adjustment means for establishing the rate at which the pulses are provided.

As will be appreciated by those skilled in the art, the secondary moves into an aligned position the inductance of the coils of the group increase. Therefore, the controller contains circuitry to sense this factor and determine that the secondary has actually moved.

The controller may include means for holding the rod in any position, via the application of full or reduced current to the last coil energized in the move. For some applications such a holding force may not be sufficient. In such cases the motor itself includes means like that to be described in detail later, which mechanically locks the rod in place.

While the round rod, linear stepping motors of the instant invention can be constructed using as few as a single coil per phase, such a construction exhibits relatively low power and efficiency. In this connection, in motor embodiments having only a single coil per phase the stray or leakage flux produced by the energization of the coil acts in opposition to the primary flux and thus lessens its effect. The deleterious action of the stray flux is substantially lessened in multiple coil per phase motor configurations, with larger coils per phase configurations being the least affected by stray flux. In addition, while multiple coil phases or groups are mathematically equivalent to single coil phases (assuming the same numbers of terms and the like) nevertheless, when the multiple coils of a phase are energized common stator plates lie within plural flux paths so that the additive effect of the flux passing through the common stator plates cause a greater pull-in force on the secondary or rod. Accordingly, when higher force is required additional coils should be added to the coils of each group. This approach results in the production of higher force levels than are attained by merely multiplying the number of coils groups.

The following TABLE V represents a comparison of different typical multiple coil per group, round rod, linear stepping motors from the standpoint of force produced and power input:

TABLE V

| Coils Per Group | Force (lbs.) produced | % Increase In Coils Per Group | % Increase In Force Produced | Power Input | Efficiency Factor Force/Power |
|---|---|---|---|---|---|
| 2 | 10 | | | 100 | .1 |
| 3 | 20 | 50 | 100 | 150 | .133 |
| 4 | 30 | 100 | 300 | 200 | .150 |

In certain applications wherein low mass and/or high acceleration of the secondary is a prime objective the motor 20 of the instant invention is modified by replacing the grooved secondary rod 24 with a low mass secondary 152 (FIG. 6). The low mas secondary basically consists of two components, a low mass tube or sleeve 154 and a rod-like insert 156. The insert 156 is disposed within the sleeve 154 but is mounted, by means (not shown), at a fixed longitudinal position within the central passageway 25 of the stator. The sleeve 154 is mounted within the bearing assemblies 118 for movement under the action of the coils of the stator up and down the passageway 25. In this regard, the sleeve 154 acts similarly to the rod 24 of the motor 20 as shown in FIG. 2 yet is of much smaller mass.

As can be seen, the sleeve 154 is composed of plural spaced rings 158 of magnetic material and interposed non-magnetic, e.g., aluminum, rings 160. The rings 158 function in an equivalent manner to the teeth 28 of the rod 24 and hence are the same width as the stator plates. In addition, the rings are separated from one another by the same distance as the width of groove 26. To that end, each of the non-magnetic rings 160 is as wide as a groove 26 in rod 24.

The fixed insert 156 acts as a magnetic backing member to provide a low reluctance return path for flux passing through the rings 158 when the stator coils adjacent thereto are energized. To that end, as can be seen, the fixed insert 156 comprises plural slugs or rod-like sections 162 of magnetic material and interposed slugs or rod-like sections 164 of non-magnetic, e.g., aluminum, material. The insert 156 is located within the stator passageway 25 such that its respective magnetic sections 162 are longitudinally aligned with the respective coil groups or phases of the stator and with the non-magnetic sections providing magnetic separation or isolation between the phases. Accordingly, as each phase of the stator is energized, as described heretofore, the flux produced by each coil takes the path consisting of the backing member 66 of the coil energized, the abutting stator plates, the air in the stator passageway 25, the magnetic rings 158 of the low mass secondary sleeve 154 and the magnetic section 162 aligned with the coil.

In accordance with a preferred aspect of this invention the sleeve 154 is constructed by gluing the magnetic rings 158 and the non-magnetic rings 160 together while the fixed insert 156 is constructed by gluing the magnetic rod like sections 162 and the non-magnetic rod-like sections 164 together. The glue at the interface of the components aids in isolating the magnetic field.

As will be appreciated by those skilled in the art, a motor constructed having a stator in accordance with the teachings of the instant invention and a secondary constructed as shown in FIG. 6 and described above produces a very high thrust-to-weight ratio of its moving member.

The presence of the grooves 26 in the rod 24 provide a convenient means for facilitating the locking of the rod upon completion of any stroke length. To that end, in accordance with another aspect of this invention an actuable locking mechanism is provided to cooperate with the grooves to lock the rod in position at the end of each stroke. The mechanism is shown in FIG. 7 and is generally denoted by the reference numeral 166. As can be seen, the locking mechanism 166 basically comprises plural moveable inserts or key elements 168, solenoid means 170 and spring biasing means 172. The key elements are disposed in two groups, 174 and 176 (FIGS. 8 and 9). Each key element is in the form of an elongated arm 178 having a pair of ends 180 and 182. Each end 180 is in the form of an enlarged plate-like head. Each key element is mounted on a pivot 186 which extends through its arm and is arranged to be pivoted thereabout between an extended position, like that shown in full in FIG. 7 and a retracted position, like that shown in phantom in FIG. 7. When a key element is in the extended position its head 180 is located within a groove 26 in the rod. Conversely, when the key element is in the retracted position its head 180 is withdrawn from the groove.

As will be described in greater detail later, the solenoid means 170 is arranged to pivot the key elements to the retracted position when the motor 20 is energized to ensure that the locking mechanism 166 doesn't impede the stepping action of the motor. The spring bias means 172 comprises a plurality of leaf springs, one for each key element of each group. Each spring 172 is arranged to pivot its associated key element to the extended position when the motor is deenergized to lock the rod in place against further displacement, even if the rod is loaded.

The key elements making up each group are disposed in a side-by-side array parallel to one another but are separate from one another such that each can be pivoted individually. As can be seen in FIG. 7 a pair of actuator arms 188 are connected to the solenoid means 170. The end of each arm terminates in an overhanging flange 190. One of the arms overlies the free end 182 of each of the key elements in group 174 while the flange on the other actuating arm extends over the free end 182 of each of the key elements in group 176.

The solenoid means is a conventional device which is connected to both actuating arms 188 such that when the stator coils of the motor 20 are energized, i.e., the motor is stepping, the coil (not shown) of the solenoid is also energized, which causes the actuator arms 188 to be withdrawn into the solenoid in the direction of the arrows shown in FIG. 7.

Each spring 172 is mounted on fixed support 192 adjacent to the rod 24. The free end of each spring, denoted by the reference numeral 194, is so biased that it contacts the rear edge of the associated key element to apply a force thereto tending to pivot the key head 180 toward the rod 24.

When the solenoid means 170 is energized, as described heretofore, the motor 20 is stepping, and the retraction of actuating arms 188 occurs with sufficient force to overcome the bias of the springs 172, so that all of the keys 168 are pivoted to the retracted position.

When the rod 24 reaches the end of its stroke and the stator coils deenergized, the coil of the solenoid means 170 is also deenergized. This action releases the key ends 182 from the actuator arms so that the bias force applied to the key heads 180 by the associated springs cause the keys to pivot to the extended position. Accordingly, each key which is aligned with a slot 26 in the motor rod 24 pivots fully into the slot, thereby locking the rod in place.

As should be appreciated by those skilled in the art the locking mechanism described heretofore is only one of many mechanical locking mechanisms that can be utilized to lock the rod of the motor at the end of a stroke.

For the mechanism 166 shown the width (thickness) of each of the key heads 180 is equal to the length of the step produced by the motor. The number of key elements required to lock the rod's fore and aft motion simultaneously is defined by the formula:

$$N = 2(\lambda/s_s) \quad (5)$$

where the number of keys is identified as N, the pitch of the secondary as $\lambda$ and the step size of the motor as $s_s$.

For the exemplary motor described heretofore having a step size of 0.1 inch (2.54 mm) and a pitch ($\lambda$) of the secondary of 0.5 inch (12.7, mm) using the formula (5) the number of key elements (N) required is calculated as follows:

$N = 2 (0.5/0.1)$
$N = 10$

Accordingly, the exemplary motor utilizes ten key elements 168, with each key element having a width of one tenth inch (2.54 mm). The ten key elements are grouped in two groups, 174 and 176, of five keys each.

In FIG. 8 there is shown the ten key element locking mechanism 166 for the motor 20 shown at the end of an exemplary stroke. In that example the first, second and third key elements 168 of the group 174 are biased within the groove 26. This action prohibits the forward motion of the rod, i.e., the motion shown by the arrow. At the same time, the eighth, ninth and tenth key elements 168 of group 176 are also located within the groove 26, thereby precluding rearward movement of the rod 24. The fourth and fifth key elements of group 174 and the sixth and seventh key elements of group 176 do not reach the extended position in a groove 26 due to the presence of opposed annular rings 28 of the rod 24.

In FIG. 9 the motor 20 is shown locked in position after having been advanced one step forward from the position shown in FIG. 8. To that end as can be seen the second, third and fourth key elements 168 of the group 174 are extended in one groove 26 of the rod, while the ninth and tenth key elements of group 716 are extended in that groove and the sixth key element of group 176 is extended in adjacent groove 26. The first and fifth key elements of group 174 and the seventh and eighth of key elements of group 176 are not disposed within any groove due to the presence of rings 28 aligned therewith. Accordingly, the presence of the second key 168 of group 174 within the groove and in contact with a ring 28 precludes the forward displacement of the rod 24 while the presence of the sixth key 168 of group 176 within the immediately adjacent groove 26 and in contact with a ring 28 precludes the rearward displacement of the rod.

As should be appreciated from the foregoing, the motor of the instant invention operates in discrete stepwise motion to provide precise positioning. The rod can be held at any displacement through the use of a very simple locking mechanism, which doesn't require any energy input to effect the locking action. In addition the motor utilizes the construction advantages inherent in round rod linear motors, namely, low cost and simplicity of components.

Without further elaboration, the foregoing will so fully illustrate my invention that others may, by applying current or future knowledge, readily adapt the same for use under various conditions of service.

What is claimed as the invention is:

1. A linear stepping motor comprising a stator defining a central passageway extending longitudinally therethrough, a secondary in the form of an elongated, cylindrical member disposed longitudinally within said passageway, said stator comprising a plurality of coil groups, each group including at least one hollow coil winding disposed between a pair of magnetic stator plates and within a magnetic coil housing, each of said stator plates having an opening therein aligned with the hollow interior of said coil winding, said coil groups being disposed co-axially, with immediately adjacent groups being separated by respective hollow non-magnetic spacer members aligned co-axially with said coil groups to form said central passageway, each coil group and an associated spacer forming one pitch of the stator, which pitch is a predetermined value, b, said cylindrical member including a plurality of annular rings of magnetic material disposed at predetermined spaced locations along said member, each annular ring and the portion of the cylindrical member between the ring and the next ring forming one pitch of the secondary, which pitch is a predetermined value, $\lambda$, the width of each annular ring being a predetermined value $t_w$, said coil groups being arranged to be pulsed by electrical energy in a predetermined sequency to effect the stepwise movement of the member along the passageway, with the minimum length of each step which the cylindrical member makes being equal to $\lambda/n$, wherein n equals the number of coils groups and wherein the length of the spacer member is equal to $b = 2\lambda - t_w$.

2. The motor of claim 1 wherein each coil group includes at least two co-axial, hollow coil windings and having a magnetic stator plate with an opening therein disposed between said windings.

3. The motor of claim 1 wherein each coil group includes at least three co-axial, hollow coil windings and having respective stator plates with openings therein disposed between immediately adjacent coil windings.

4. The motor of claim 1 wherein each coil group includes at least four co-axial, hollow coil windings and having respective stator plates with openings therein disposed between immediately adjacent coil windings.

5. The motor of claim 2 wherein said stator comprises five coil groups.

6. The motor of claim 1 wherein bearing members are mounted on said stator.

7. The motor of claim 6 wherein said bearing members are mounted on the stator adjacent its ends.

8. The motor of claim 1 wherein said member is a rod formed of a magnetic material with a plurality of peripheral grooves cut therein at spaced locations and with the peripheral portions of the rod between said grooves defining said annular rings.

9. The motor of claim 1 wherein said member is a hollow tube with the portions disposed between said annular rings being formed of a non-magnetic material.

10. The motor of claim 9 wherein a rod is disposed within said hollow tube and is formed of magnetic and non-magnetic material sections, with the magnetic sections being disposed opposite to the coil groups of the stator.

11. The motor of claim 8 additionally comprising means to lcok said rod in position, said means comprising at least one moveable member adapted to move into a groove in said rod when the rod has stopped moving.

12. A linear stepping motor comprising a stator defining a central passageway extending longitudinally therethrough, a secondary in the form of an elongated, cylindrical member disposed longitudinally within said passageway, said stator comprising: a plurality of coil groups, each group including at least one hollow coil winding disposed between a pair of magnetic stator plates and within a magnetic coil housing, each of said stator plates being a unitary member having an opening therein aligned with the hollow interior of said coil winding, the opening in each stator plate being of smaller diameter than the hollow interior of said coil winding so that its periphery forms a pole extending into the central passageway, said coil groups being disposed co-axially, with immediately adjacent groups being separated by respective hollow non-magnetic spacer members aligned co-axially with said coil groups to form said central passageway, said cylindrical member including a plurality of annular rings of magnetic material disposed at predetermined spaced locations along said member, said coil groups being arranged to be pulsed by electrical energy in a predetermined sequence to effect the stepwise movement of the member along the passageway.

13. The linear stepping motor of claim 12 wherein said cylindrical member is a hollow tube with the portions disposed between said annular ring being formed of a non-magnetic material and wherein a rod is disposed within said hollow tube and is formed of magnetic and non-magnetic material sections, with the magnetic sections being disposed opposite to the coil groups of the stator.

* * * * *